(12) United States Patent
Warner et al.

(10) Patent No.: US 11,303,600 B1
(45) Date of Patent: Apr. 12, 2022

(54) DISPLAYING TEXT CONVERSATIONS WITH CONTEXTUAL IMAGES

(71) Applicant: Meta Platforms, Inc., Menlo Park, CA (US)

(72) Inventors: Kathleen Warner, San Francisco, CA (US); Diego De Pinho Mendes, San Carlos, CA (US); Yfat Eyal, Redwood City, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 16/869,010

(22) Filed: May 7, 2020

(51) Int. Cl.
*H04L 12/58* (2006.01)
*H04L 51/224* (2022.01)
*G06F 3/04817* (2022.01)
*H04L 51/52* (2022.01)
*H04L 51/10* (2022.01)

(52) U.S. Cl.
CPC .......... *H04L 51/24* (2013.01); *G06F 3/04817* (2013.01); *H04L 51/10* (2013.01); *H04L 51/32* (2013.01)

(58) Field of Classification Search
CPC ......... H04L 51/32; H04L 51/10; H04L 51/24; G06F 3/048; G06F 3/04817
See application file for complete search history.

(56) References Cited

U.S. PATENT DOCUMENTS

| | | | | |
|---|---|---|---|---|
| 9,183,172 | B1* | 11/2015 | Anderson | G06Q 50/01 |
| 9,661,086 | B2* | 5/2017 | Sadan | G06Q 50/01 |
| 2012/0176370 | A1* | 7/2012 | Imai | H04N 13/361 |
| | | | | 345/419 |
| 2014/0122622 | A1* | 5/2014 | Castera | H04L 51/04 |
| | | | | 709/206 |
| 2014/0214944 | A1* | 7/2014 | Sadan | G06Q 50/01 |
| | | | | 709/204 |
| 2015/0264308 | A1* | 9/2015 | Chastney | H04W 4/12 |
| | | | | 715/753 |
| 2016/0057181 | A1* | 2/2016 | Henning | H04L 65/4015 |
| | | | | 715/753 |
| 2017/0019474 | A1* | 1/2017 | Tevosyan | G06Q 50/01 |
| 2018/0167347 | A1* | 6/2018 | Patierno | H04L 51/10 |
| 2018/0234371 | A1* | 8/2018 | Lande | H04L 51/10 |

* cited by examiner

*Primary Examiner* — Jeong S Park
(74) *Attorney, Agent, or Firm* — Fenwick & West LLP

(57) ABSTRACT

A social networking system provides a user interface for a sending user to send messages to a recipient user in association with a content item posted by the recipient user in the social networking system. The sending user views a content item posted by the recipient user, such as a photograph. The sending user posts a direct message to the recipient user related to the content item. The direct message is displayed to the sending user superimposed over the content item. Subsequent direct messages in the conversation are also displayed superimposed over the content item.

20 Claims, 6 Drawing Sheets

300

Generate a newsfeed for a first user comprising a content item posted by a second user.
310

Generate a messaging interface for the content item.
320

Receive a message from the first user via the messaging interface for the content item.
330

Superimpose the message over the content item.
340

Transmit the message to the second user.
350

Receive a response to the message from the second user.
360

Superimpose the response to the message over the content item.
370

FIG. 3

DISPLAYING TEXT CONVERSATIONS WITH CONTEXTUAL IMAGES

BACKGROUND

This disclosure relates generally to social networking systems, and more specifically to displaying messages in social networking systems.

Social networking systems often include a messaging application that allows users to exchange messages in a private conversation between users. The conversation may include all messages exchanged between the users. Social networking systems often also allow users to post comments on content items posted by other users. The comments may be viewable by other users. To send a private message regarding a content item, a user may send a message via the messaging application and reference the content item in the message.

SUMMARY

A social networking system provides a user interface for a sending user to send messages to a recipient user in association with a content item posted by the recipient user in the social networking system. The sending user views a content item posted by the recipient user, such as a photograph. The sending user posts a direct message to the recipient user related to the content item. For example, the sending user may type a message in a reply field displayed over or adjacent to the content item. The direct message is displayed to the sending user superimposed over the content item. Subsequent direct messages in the conversation are also displayed superimposed over the content item. Previous messages may scroll up in response to new messages being displayed. The recipient user may view the conversation in a messaging interface. The social networking system may display a notification badge or icon over the content item indicating that a conversation exists for the content item. In contrast to public comments or direct messages sent without context, the messaging interfaces described herein facilitate private conversations between users which provide the context of the content item to which the conversation is related. Additionally, the messaging interfaces described herein allow the sending user to send messages to the recipient user without redirecting the sending user to a messaging application which may interrupt the sending user's session.

In some embodiments, a method may comprise generating, by a processor in an online system, a feed for a first user. The feed may comprise a content item posted by a second user. The processor may generate a messaging interface for the content item. The processor may receive a message from the first user via the messaging interface for the content item. Metadata associated with the message may identify the content item. The processor may superimpose the message over the content item.

BRIEF DESCRIPTION OF THE DRAWINGS

FIG. 3 is a flowchart of a method for generating a messaging interface, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
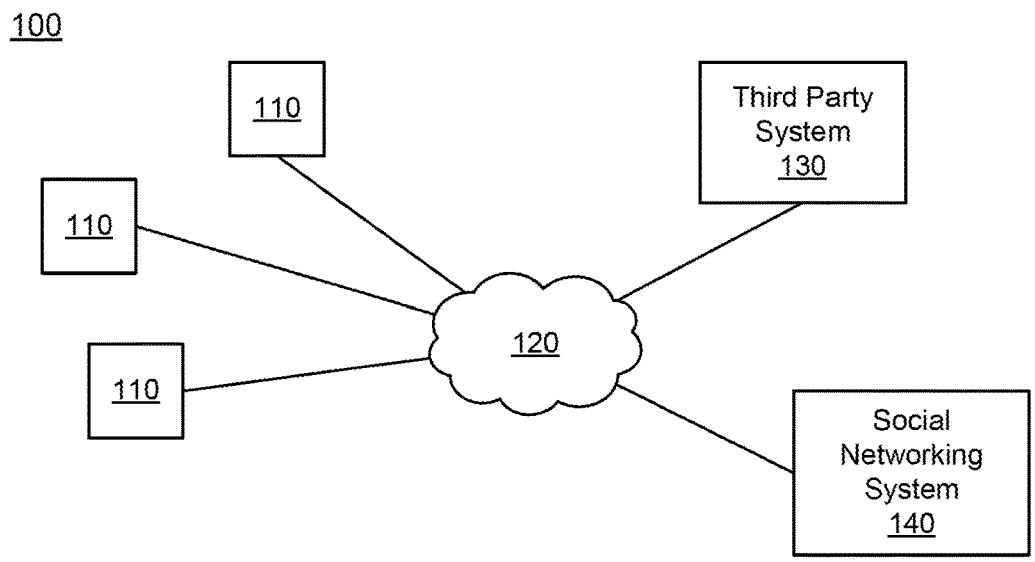
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
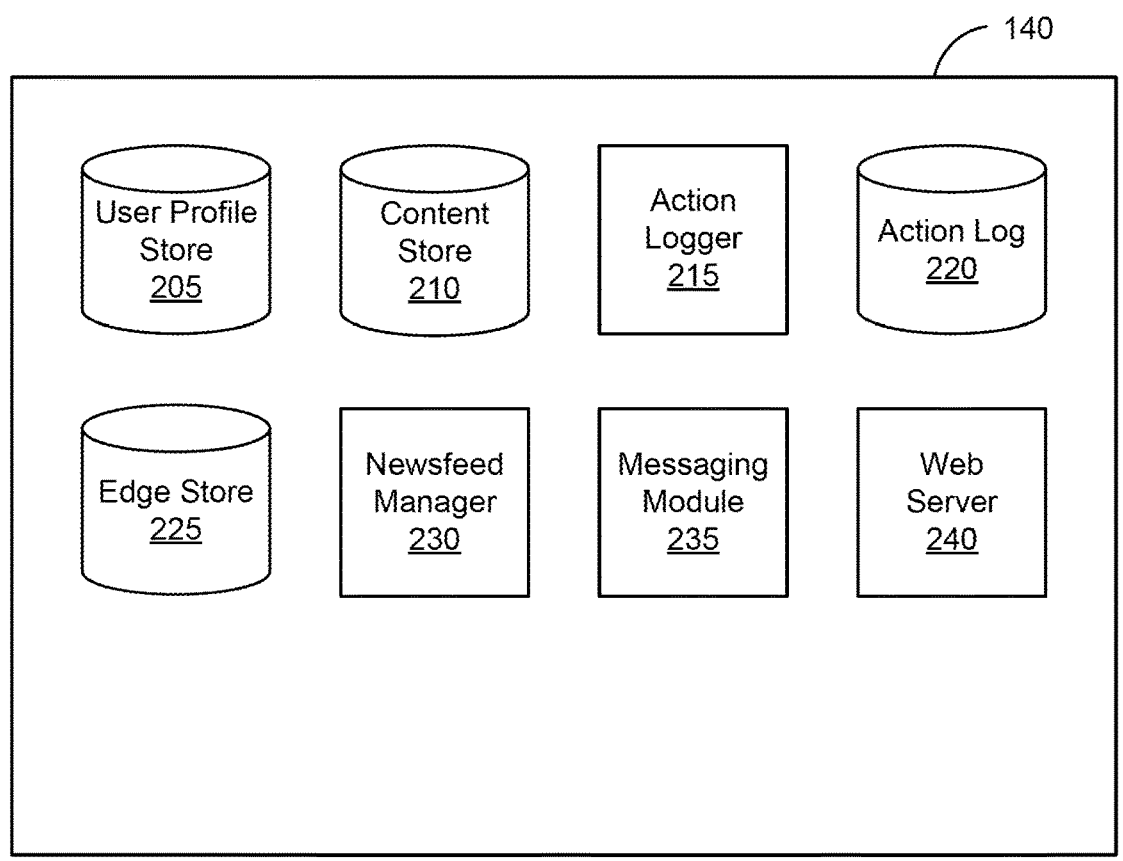
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a newsfeed manager 230, a messaging module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in the content store 210. One or more of the candidate stories are selected and presented to a user by the newsfeed manager 230.

For example, the newsfeed manager 230 receives a request to present one or more stories to an online system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 105. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the online system 140 from various users to obtain information about user preferences or actions from the analyzed stories. This information may be used to refine subsequent selection of stories for newsfeeds presented to various users.

The messaging module 235 generates interfaces to facilitate the exchange of messages between users. The messaging module 235 receives messages from a sending user related to a content item in a feed, and the messaging module 235 generates a messaging interface that is superimposed over the content item. Messages received via the messaging interface for a content item may comprise a tag, such as a piece of code, that identifies the content item. The messaging module 235 may provide the messaging interface to the content store 210 in order to modify the content item to include the messaging interface for presentation to the user. The messaging module 235 may generate a messaging interface comprising all conversations in which the user is a participant. The messaging module 235 may provide visual indicators to indicate conversations that are related to a content item.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Generating a Messaging Interface for a Content Item

FIG. 3 is a flowchart of a method 300 for generating a messaging interface for a content item, in accordance with one or more embodiments. An online system, such as the online system 140 of FIG. 2, generates 310 a feed for a first user. The feed may comprise a plurality of content items posted by a plurality of users. The feed comprises a content item posted by a second user. The content item may comprise an image, a video, text, or some combination thereof. In some embodiments, the content item may be viewable for a limited duration or a limited number of views. For example, the content item may be deleted by the online system after twenty-four hours, or the first user may be prevented from viewing or accessing the content item more than twice. The first user may select the content item, such as by tapping, swiping, or clicking on the content item.

The online system generates 320 a messaging interface for the content item. In some embodiments, the online system may generate the messaging interface for the content item in response to the first user selecting the content item. In some embodiments, the online system may generate a messaging interface for each of a plurality of content items displayed in the feed. The messaging interface is configured to allow the first user to send a direct message to the second user. The direct message may be viewable only by the first user and the second user. The messaging interface may display a text entry field for the first user to enter text, images, or other content. The messaging interface displays the content item. The messaging interface may display the content item in a size larger than the content item was displayed in the feed. For example, the content item may be expanded to fill at least 50% or at least 90% of the screen on the client device.

The online system receives 330 a message from the first user via the messaging interface for the content item. For example, the first user may have typed, spoken, selected an image, or otherwise entered content into the text entry field of the messaging interface. The first user may enter content into the text entry field by any other suitable method as is known in existing messaging applications. The online system may store the message in association with the content item in the content store. The message may comprise metadata indicating that the message was submitted via the messaging interface for the content item. For example, the message may comprise a tag, such as a piece of code, that identifies the content item. In response to the first user or the second user subsequently accessing the content item, the online system may retrieve any messages associated with the content item.

The online system superimposes 340 the message over the content item in the messaging interface. The superimposed message is part of an active message thread, to which the first user and the second user may post additional messages to be displayed over the content item in the messaging interface. In some embodiments, the online system may superimpose the image over the content item based on the metadata associated with the message identifying the content item. In some embodiments, the message may be displayed in a message bubble. The message bubble may be opaque, transparent, partially transparent, or some combination thereof. The message bubble may comprise a visible outline. The text may be displayed within the message bubble. In embodiments with an opaque or partially transparent message bubble, the message bubble may obscure a portion of the content item. In embodiments with a transparent or partially transparent message bubble, the content item may be at least partially visible behind the message bubble, and the content item may be obscured by the text within the message bubble. In some embodiments, the text color may be selected at least partially based on the color of the content item in order to increase contrast between the message text and the item. For example, for a lightly colored content item, the online system may select black text for the message, and for a darkly colored content item, the online system may select white text for the message.

The online system transmits 350 the message to the second user. The online system may transmit a notification to the second user that the first user sent the message. The online may display a notification badge over the content item for the second user. For example, in the second user's profile page, or in the second user's feed, the online system may display the content item, and the online system may also display the notification badge on top of or adjacent to the content item. In response to the second user selecting the content item or selecting the notification badge, the online system may display the message superimposed over the content item. In some embodiments, the second user may have received messages associated with the content item from a plurality of users. The online system may display a separate notification badge for each user that transmitted a message to the second user for the content item. In some embodiments, the notification badges may comprise an icon, such as a thumbnail image of the profile picture for the user sending the message. The second user may access messages from a user by selecting the icon associated with the user. Thus, the second user may be able to separately view the conversations with each user.

Additionally, or alternatively, the online system may transmit the message to the second user via a messaging application associated with the online system. For example, the messaging application may display all conversations in which the second user is a participant, and the message application may display the message as a new message in a conversation between the first user and the second user. In some embodiments, the online system may transmit an image of the content item through the messaging application. The image of the content item may provide context for the second user to know that the message from the first user was submitted via the messaging interface for the content item. For example, if the message from the first user says, "where are you," and is sent without any other context, the message may be interpreted by the second user differently than if the message is transmitted along with an image of the content item. If the first user sends messages via messaging interfaces from multiple content items, the online system may send an image for each content item, and the image may be displayed above the message associated with the respective content item.

The online system receives 360, from the second user, a response to the message. In some embodiments, the second user may enter the response in a text entry field in a messaging interface for the content item. Similar to the messaging interface for the content item presented to the first user, the online system may generate and display a messaging interface for the content item to the second user. Alternatively, or in addition, the second user may submit the response via the messaging application.

The online system superimposes 370 the response over the content item in the messaging interface displayed to the first user. Similarly, the online system may superimpose the response over the content item in the messaging interface displayed to the second user. The response may be displayed similarly to the message, such as in a message bubble that is opaque, transparent, or partially transparent. The messaging interface may move previous messages up in the messaging interface and display the response in the lowermost message position.

In some embodiments, the messaging interface may comprise one or more fade lines, above which the messages change appearance. Above, the fade line, the messages become less visible. For example, the messages may become more transparent, change color, or disappear completely above the fade line. The fade line itself may not be visible to the viewer. The user may input a vertical scroll command to scroll messages back into view.

Figure 4:
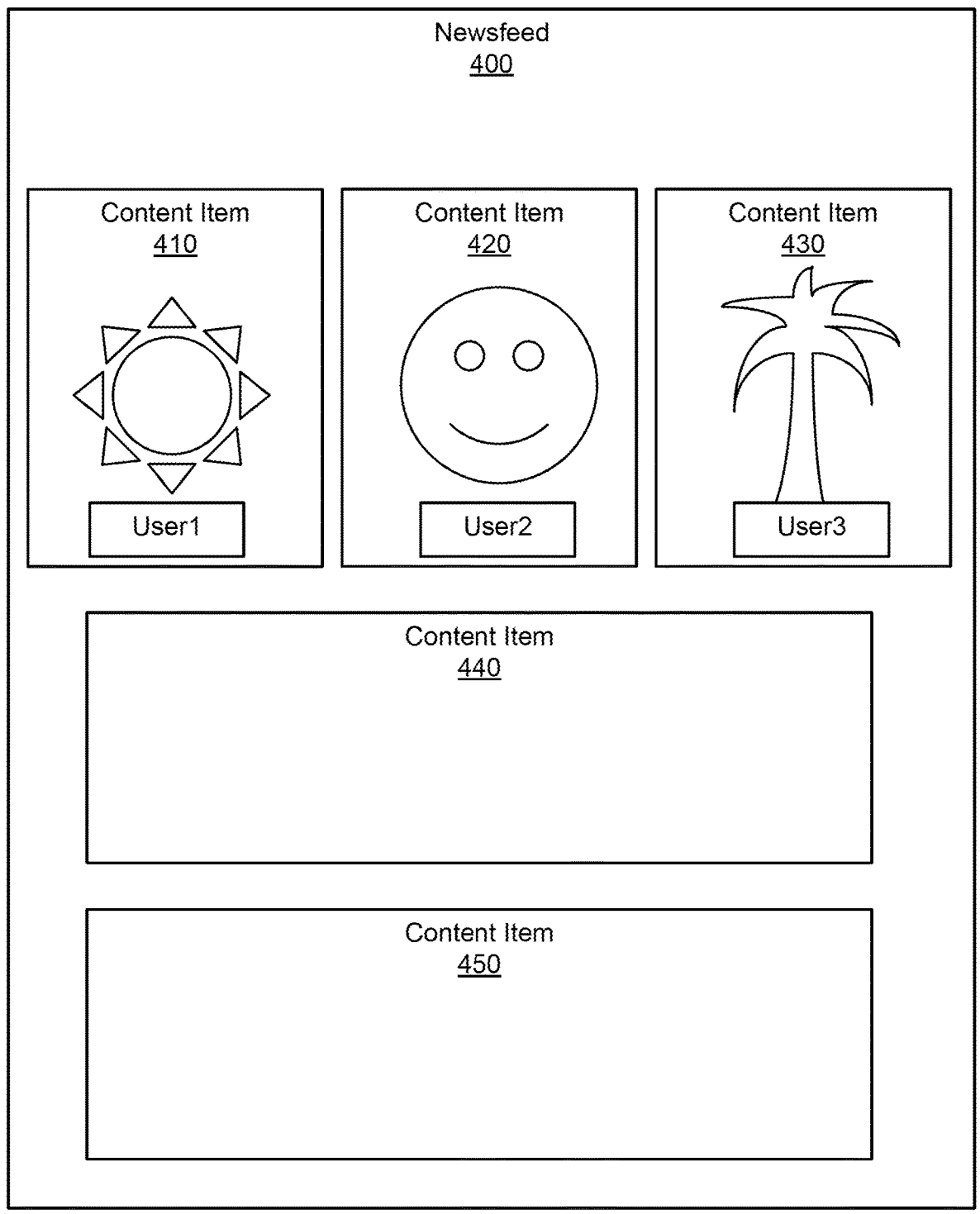
FIG. 4 is a user interface for a feed, in accordance with an embodiment.

FIG. 4 illustrates a user interface for a feed 400, in accordance with one or more embodiments. The feed 400 is an embodiment of a feed generated by the online system 140 of FIG. 2. The feed 400 comprises a content item 410 posted by a first user, a content item 420 posted by a second user, and a content item 430 posted by a third user. The content items 410, 420, 430 may be horizontally scrollable. The content items 410, 420, 430 may be stories, as previously described with respect to FIG. 2. The content items 410, 420, 430 may each comprise an image, video, text, or some combination thereof In some embodiments, one or more of the content items 410, 420, 430 may be associated with multiple images, and one of the images is displayed on the feed 400. In response to the user selecting the content item, the additional images may be displayed to the user. The content items 410, 420, 430 may each identify the user that posted the respective content item, such as by displaying the user's name or image. The feed 400 comprises additional content items 440, 450. In some embodiments, in response to scrolling vertically, the content items 440, 450 may be replaced by other content items in the feed, and the content items 410, 420, 430 may remain stationary and in view. The user may select one of the content items to begin or return to a conversation for the content item. In some embodiments, only the horizontally scrollable content items 410, 420, 430 may be available for creation of a messaging interface. In other embodiments, all content items 410, 420, 430, 440, 450 may be available for creation of a messaging interface.

Figure 5:
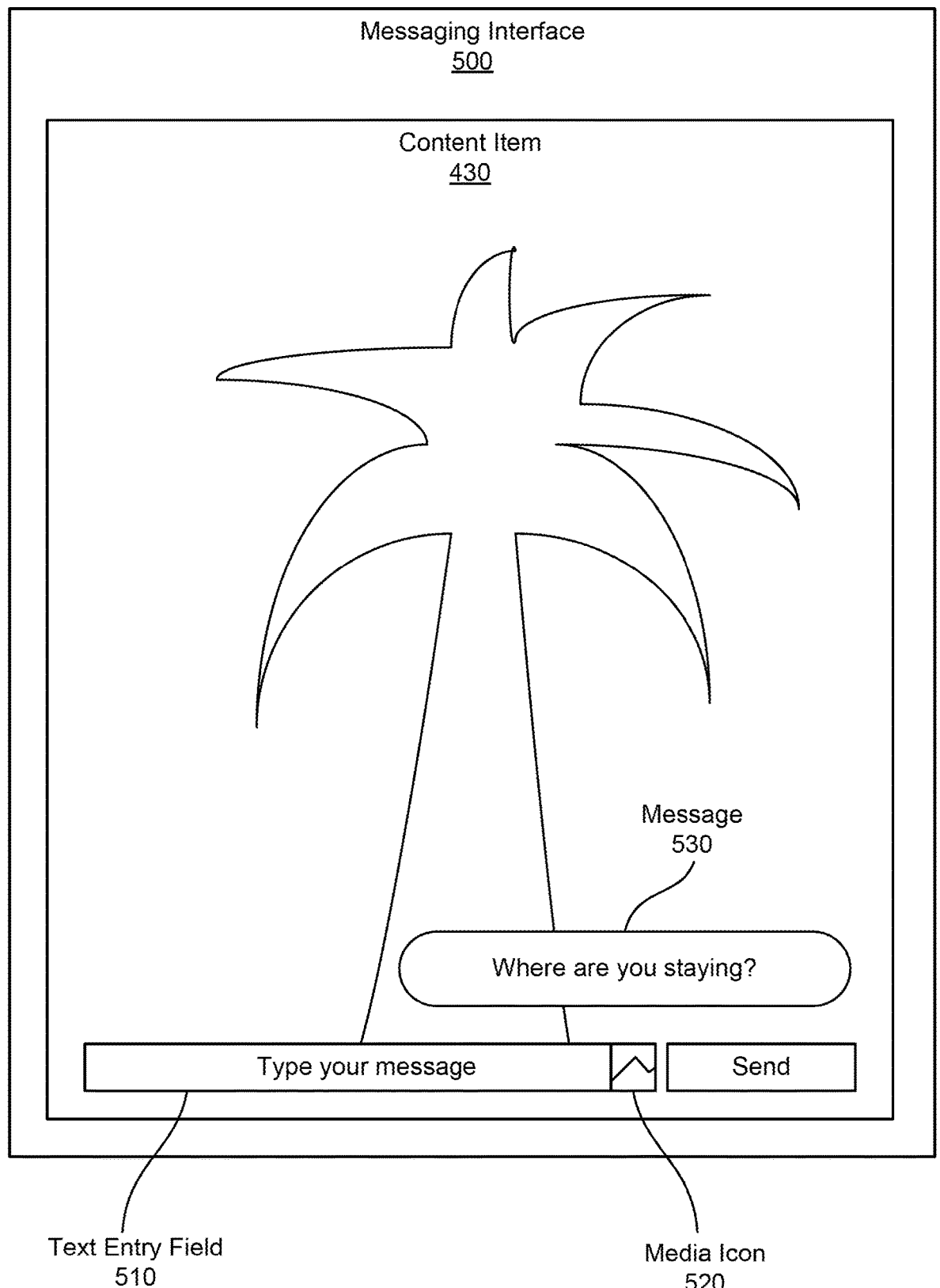
FIG. 5 is a messaging interface for a content item, in accordance with an embodiment.

FIG. 5 illustrates a messaging interface 500 for the content item 430, in accordance with an embodiment. In response to the user selecting the content item 430 from the feed 400 shown in FIG. 4, the online system generates the messaging interface 500 for the content item 430. The messaging interface 500 shows the content item 430. The messaging interface 500 includes a text entry field 510. The text entry field 510 may include a media icon 520 which the user may select to send images, videos, emojis, etc. In response to the user submitting a message, the message 530 is displayed superimposed over the content item 430.

Figure 6:
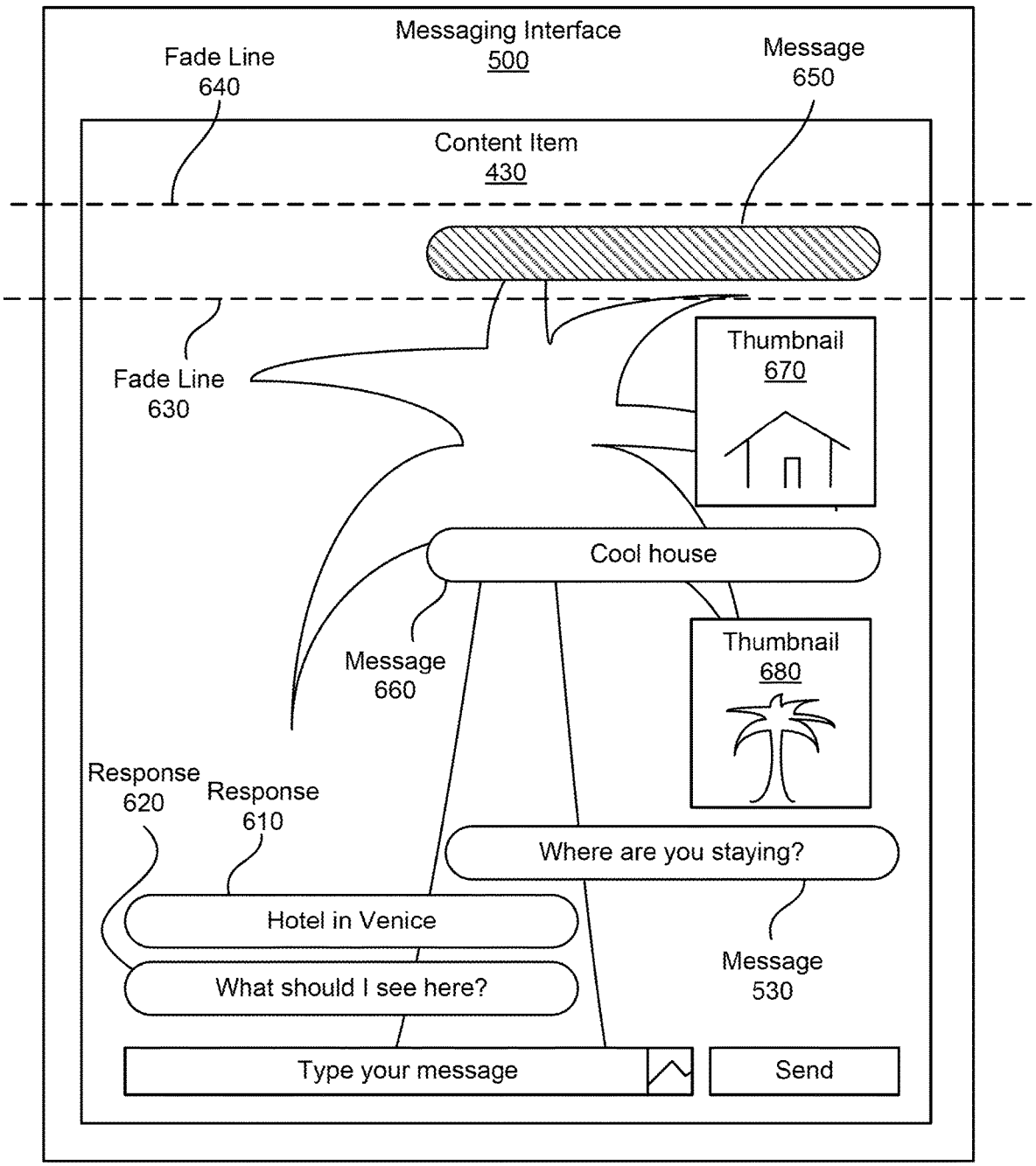
FIG. 6 is the messaging interface for the content item including response messages, in accordance with an embodiment.

FIG. 6 illustrates the messaging interface 500 for the content item 430 including reply messages, in accordance with an embodiment. The recipient user may transmit a response to the message 530. For example, the recipient user may submit the response via the messaging application. In response to receiving the response, the online system displays the response in the messaging interface 500. As shown, the messaging interface 500 displays a first response 610 and a second response 620 sent by the recipient user. Each subsequent message in the conversation is displayed in a lowest message position, and previous messages are moved upwards on the messaging interface 500.

The messaging interface 500 comprises a first fade line 630 and a second fade line 640. In response to a message being moved above the first fade line 630, the online system may change a display property of the message. For example, the online system may change the opacity or color of the message 650. In response to a message being moved above the second fade line 640, the messaging interface 500 may remove the message from view or display only the portion of the message which is below the second fade line 640. In response to the user scrolling downward vertically, the messaging interface 500 may display previous messages below the second fade line 640.

The messaging interface 500 may display messages submitted by the sending user via messaging interfaces for multiple content items posted by the recipient user. For example, the sending user may have submitted a message 660 via a messaging interface for a content item different than the content item 430. The messaging interface 500 may display a thumbnail image 670 of the content item to provide context that the message 660 was submitted via the messaging interface for the content item. The messaging interface 500 displays a thumbnail image 680 of the content item 430 to indicate that subsequent messages were sent via the messaging interface 500 for the content item 430. Thus, the messages sent via messaging interfaces may be displayed in a single messaging interface 500 while maintaining the context of how the messages were sent by the sending user.

Figure 7:
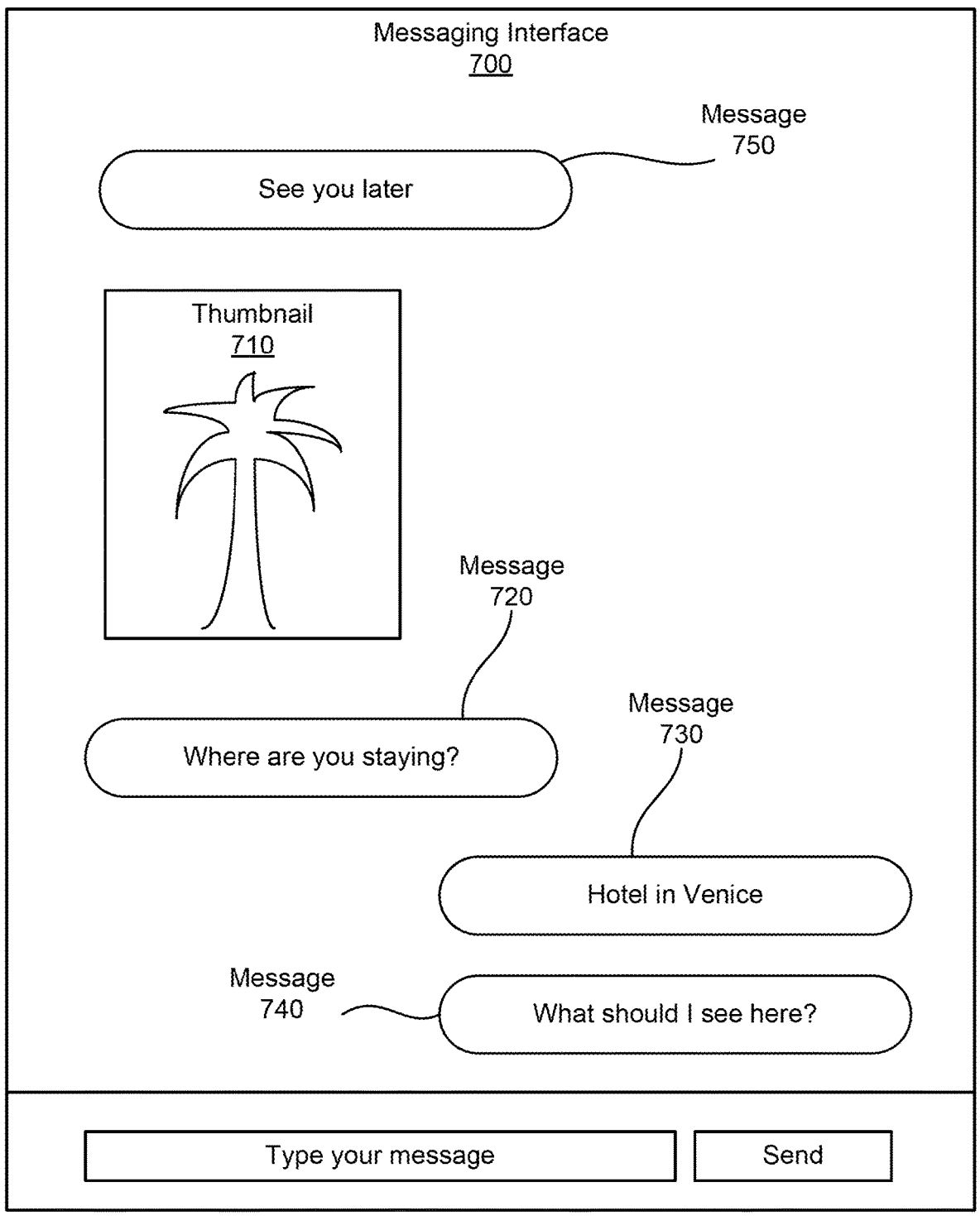
FIG. 7 is a user interface for a messaging interface for a messaging application, in accordance with an embodiment.

FIG. 7 illustrates a messaging interface 700 for a messaging application, in accordance with an embodiment. The recipient user that posted the content item 430 of FIG. 4 may receive messages via the messaging interface 700 for messages posted by other users via messaging interfaces for the content item 430. The messaging interface 700 displays a conversation between the recipient user and the sending user. The messaging interface 700 may display a thumbnail image 710 of the content item 430. The thumbnail image 710 provides context to the recipient user to know that the subsequently displayed messages 720, 730, 740 are associated with the content item 430 and may have been submitted via a messaging interface for the content item 430. The messaging interface 700 may also display previous messages between the recipient user and the sending user that were not submitted via the messaging interface for the content item 430. For example, the messaging interface 700 displays a previously submitted message 750. Thus, the recipient user may view all messages between the recipient user and the sending user in the messaging interface 700 while maintaining the context of how the messages were sent by the sending user.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating, by a processor in an online system, a feed for a first user, the feed comprising a content item posted by a second user;
   generating, by the processor, a messaging interface between the first user and the second user for the content item;
   receiving, by the processor, a message from the first user via the messaging interface for the content item, wherein metadata associated with the message identifies the content item;
   superimposing, by the processor, the message over the content item;
   receiving, by the processor and from the second user, a response to the message;
   superimposing, by the processor, an active messaging thread between the first user and the second user over the content item, wherein the active messaging thread comprises the message and the response;
   generating, by the processor, an icon for each of a plurality of active messaging threads for the content item, wherein each active messaging thread corresponds to an active messaging thread between the second user and a different user; and
   superimposing, by the processor and in response to the second user selecting one of the icons, a corresponding active messaging thread over the content item.

2. The method of claim 1, further comprising transmitting, by the processor, the message and a thumbnail of the content item to the second user.

3. The method of claim 1, wherein the messaging interface for the content item is generated in response to the first user selecting the content item.

4. The method of claim 1, wherein the message and the response are direct messages viewable only by the first user and the second user.

5. The method of claim 1, further comprising superimposing, by the processor, a thumbnail over the content item.

6. The method of claim 1, wherein the message comprises text within a message bubble.

7. The method of claim 6, wherein the message bubble is at least partially transparent.

8. A computer program product comprising a non-transitory computer-readable storage medium containing computer program code for:
   generating, by a processor in an online system, a feed for a first user, the feed comprising a content item posted by a second user;
   generating, by the processor, a messaging interface between the first user and the second user for the content item;
   receiving, by the processor, a message from the first user via the messaging interface for the content item, wherein metadata associated with the message identifies the content item;
   superimposing, by the processor, the message over the content item;
   receiving, by the processor and from the second user, a response to the message;
   superimposing, by the processor, an active messaging thread between the first user and the second user over the content item, wherein the active messaging thread comprises the message and the response;

generating, by the processor, an icon for each of a plurality of active messaging threads for the content item, wherein each active messaging thread corresponds to an active messaging thread between the second user and a different user; and superimposing, by the processor and in response to the second user selecting one of the icons, a corresponding active messaging thread over the content item.

9. The computer program product of claim 8, further containing computer program code for transmitting, by the processor, the message and a thumbnail of the content item to the second user.

10. The computer program product of claim 8, wherein the messaging interface for the content item is generated in response to the first user selecting the content item.

11. The computer program product of claim 8, wherein the message and the response are direct messages viewable only by the first user and the second user.

12. The computer program product of claim 8, further containing computer program code for superimposing, by the processor, a thumbnail over the content item.

13. The computer program product of claim 8, wherein the message comprises text within a message bubble.

14. The computer program product of claim 13, wherein the message bubble is at least partially transparent.

15. A computer program product comprising a non-transitory computer-readable storage medium containing computer program code that comprises:

a newsfeed manager module configured to generate a feed for a first user, the feed comprising a content item posted by a second user; and a messaging module configured to:

generate a messaging interface between the first user and the second user for the content item;

receive a message from the first user via the messaging interface for the content item, wherein metadata associated with the message identifies the content item;

superimpose the message over the content item;

receive, from the second user, a response to the message; and superimpose an active messaging thread between the first user and the second user over the content item, wherein the active messaging thread comprises the message and the response;

generate an icon for each of a plurality of active messaging threads for the content item, wherein each active messaging thread corresponds to an active messaging thread between the second user and a different user; and superimpose, in response to the second user selecting one of the icons, a corresponding active messaging thread over the content item.

16. The computer program product of claim 15, wherein the messaging module is further configured to transmit the message and a thumbnail of the content item to the second user.

17. The computer program product of claim 15, wherein the messaging interface for the content item is generated in response to the first user selecting the content item.

18. The computer program product of claim 15, wherein the message and the response are direct messages viewable only by the first user and the second user.

19. The computer program product of claim 15, wherein the messaging module is further configured to superimpose a thumbnail over the content item.

20. The computer program product of claim 15, wherein the message comprises text within a message bubble.

\* \* \* \* \*